United States Patent [19]
Falke et al.

[11] Patent Number: 5,654,344
[45] Date of Patent: Aug. 5, 1997

[54] PRODUCTION OF RIGID TO SEMIRIGID POLYURETHANE FOAMS HAVING AN INCREASED PROPORTION OF OPEN CELLS AND REDUCED SHRINKAGE

[75] Inventors: Peter Falke, Schwarzheide; Inge Rotermund, Ortrand; Bernhard Naber, Schwarzheide, all of Germany

[73] Assignee: BASF Aktiengesellschaft, Ludwigshafen, Germany

[21] Appl. No.: 415,822

[22] Filed: Apr. 3, 1995

[30] Foreign Application Priority Data

Apr. 8, 1994 [DE] Germany .................. 44 11 864.3

[51] Int. Cl.$^6$ .................. C08J 11/04; C08G 8/04
[52] U.S. Cl. .................. 521/49; 521/49.5; 521/172; 521/174; 528/156
[58] Field of Search .................. 521/49, 49.5, 172, 521/174; 528/156

[56] References Cited

U.S. PATENT DOCUMENTS

| | | |
|---|---|---|
| 3,738,946 | 6/1973 | Frulla et al. .................. 521/49.5 |
| 4,014,809 | 3/1977 | Kondo et al. |
| 4,110,266 | 8/1978 | Sheratte .................. 521/49.5 |
| 4,511,680 | 4/1985 | Niederdellmann et al. .................. 521/49.5 |
| 5,300,530 | 4/1994 | Machado et al. .................. 521/49.5 |
| 5,357,006 | 10/1994 | Gassan . |
| 5,410,008 | 4/1995 | Bauer . |

FOREIGN PATENT DOCUMENTS

| | | |
|---|---|---|
| 105167 | 4/1984 | European Pat. Off. . |
| 2516863 | 4/1975 | Germany . |
| 156480 | 12/1980 | Germany . |
| 3702495 | 1/1987 | Germany . |
| 4024601 | 5/1991 | Germany . |
| 4215014 | 5/1992 | Germany . |

*Primary Examiner*—Morton Foelak
*Attorney, Agent, or Firm*—Fernando A. Borrego

[57] ABSTRACT

The invention relates to a process for the production of rigid to semirigid polyurethane foams having an increased proportion of open cells and reduced shrinkage using recyclate polyols. The invention furthermore relates to the rigid to semirigid polyurethane foams produced by this process.

16 Claims, No Drawings

PRODUCTION OF RIGID TO SEMIRIGID POLYURETHANE FOAMS HAVING AN INCREASED PROPORTION OF OPEN CELLS AND REDUCED SHRINKAGE

The present invention relates to a process for the production of rigid to semirigid polyurethane foams having an increased proportion of open cells and reduced shrinkage using recyclate polyols. The present invention furthermore relates to the rigid to semirigid polyurethane foams produced by this process.

The production of rigid to semirigid polyurethane foams by reacting organic polyisocyanates and/or modified organic polyisocyanates with relatively highly functional compounds containing at least two reactive hydrogen atoms and, if desired, low-molecular-weight chain extenders and/or crosslinking agents in the presence of catalysts, blowing agents, auxiliaries and/or additives is known and has been described many times. A comprehensive review of the production of rigid polyurethane foams is given, for example, in Kunststoff-Handbuch, Volume VII, Polyurethanes, 1st Edition, 1966, edited by Dr. R. Vieweg and Dr. A. Höchtlen, and 3rd Edition, 1993, edited by Becker/Braun (Carl. Hauser Verlag, Munich).

It is likewise known that rigid to semirigid polyurethane foams can be produced using polyols which have themselves been obtained from polyurethane scrap by reaction with compounds containing at least two OH groups, known as glycolysis. Thus, for example, DE-A-25 16 863 describes the preparation of a polyol mixture from polyurethane scrap and aliphatic diols which is suitable for the production of rigid polyurethane foams. According to DE-A-40 24 601, glycolysis of polyurethane-urea scrap gives a polyol-containing dispersion which can be employed for the preparation of rigid or semirigid polyurethanes or polyurethane-ureas. According to U.S. Pat. No. 4,014,809 (DE-A-25 57 172), polyol-containing liquid mixtures synthesized from rigid polyurethane foams can be re-used as a rigid foam component. Polyol-containing liquids prepared according to DE-A-37 02 495 from polyurethane scrap are described as being suitable for semirigid and rigid polyurethanes, in particular polyurethane foams.

All the recyclate polyols prepared by said processes contain the amines which are likewise formed on glycolysis; these represent a health risk and in addition have an adverse effect in the polyurethane systems formulated from the recyclate polyols. They greatly accelerate the polyurethane formation reaction, form rigid urea groups and reduce the controllability of the polyurethane formation reaction by other catalysts. Furthermore, the content of free amines in polyol components of polyurethane systems in contact with isocyanates immediately results in highly thixotropic compositions, as described in DD-A-156 480. The recyclate polyol deaminated according to DE-A-40 24 601 by addition of monomeric acrylic acid has an acid number of significantly above 1 mg of KOH/g, which can result in problems in the polyurethane systems containing the recyclate polyol. The noticeable odor of acrylic acid is also undesired.

It is furthermore known that rigid foams can be produced predominantly as closed-cell foams in order to achieve a good thermal insulation capacity. The requirement for open-celled foams is rare in the area of rigid foams. The above-mentioned Kunststoff-Handbuch, Volume VII, Polyurethanes, only mentions open-celled rigid foams as an aside as a foam for flower arranging. Applications of open-celled, rigid or semirigid polyurethane foams as mechanically stable filters for liquids and gases, absorber columns for the purification of gases and substrates for the culture of microorganisms are also known.

The open-celled character can be achieved by specifically structured polyols containing high proportions of ethylene oxide, or alternatively by using specific polymethylsilicones in the polyurethane systems. In all cases, it is difficult, and left to the skill of the formulator, to achieve a targeted proportion of open cells. The difficulties are that over-early opening of the cells results in foam collapse or "natural pores", while excessively late opening allows the foams to crack or shrink.

It is an object of the present invention to provide a simple, inexpensive and robust process for the production of substantially open-celled, rigid to semirigid polyurethane foams. We have found that, surprisingly, this object is achieved by carrying out the production of the rigid to semirigid polyurethane foams in the presence of a recyclate polyol obtained by glycolysis of polyurethanes and/or polyurea-polyurethanes using glycidyl ethers.

The present invention accordingly provides a process for the production of rigid to semirigid polyurethane foams having an increased content of open cells and reduced shrinkage, by reacting a) organic and/or modified organic polyisocyanates with b) at least one relatively high-molecular-weight compound containing at least two reactive hydrogen atoms, and, if desired, c) low-molecular-weight chain extenders and/or crosslinking agents, in the presence of d) catalysts, e) if desired, blowing agents and f) if desired, auxiliaries and/or additives, wherein component b) is at least one recyclate polyol obtained by glycolysis of polyurethanes and/or polyurea-polyurethanes using glycidyl ethers, without the use of special cell openers.

The present invention furthermore provides the rigid to semirigid polyurethane foams produced by this process.

The novel process for the production of rigid to semirigid polyurethane foams using recyclate polyols obtained from polyurethanes or polyurea-polyurethanes is simple and can be carried out by any polyurethane user without major investment and safety precautions. The polyurethane foams produced in this way are inexpensive and suitable for all conventional applications of rigid to semirigid polyurethane foams in which an increased proportion of open cells is important.

The following details apply to the starting components for the production of the novel rigid to semirigid polyurethane foams:

a) Suitable organic polyisocyanates are the aliphatic, cycloaliphatic, araliphatic and preferably aromatic polyisocyanates known per se. The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, eg. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures. Frequently, modified polyisocyanates are also used, ie. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate, 4,4'- and 2,4'-diphenylmethane diisocyanate mixtures, or crude MDI or 2,4- or 2,6-tolylene diisocyanate, in each case, modified by means of low-molecular-weight diols, triols, dialkylene glycols, trialkylene glycols or polyoxyalkylene glycols having molecular weights of up to 6000, in particular up to 1500, specific examples of di- and polyoxyalkylene glycols, which can be employed individually or as mixtures, being diethylene, dipropylene, polyoxyethylene, polyoxypropylene and polyoxypropylene-polyoxyethylene glycols, triols and/or tetrols. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, eg. based on 4,4'-, 2,4'- and/or 2,2'-diphenylmethane diisocyanate and/or 2,4- and/or 2,6-tolylene diisocyanate, have also proven successful. The modified polyisocyanates may be mixed with one another or with unmodified organic polyisocyanates, eg. 2,4'- or 4,4'-diphenylmethane diisocyanate, crude MDI or 2,4- and/or 2,6-tolylene diisocyanate. Organic polyisocyanates which have proven particularly successful and are therefore preferred are: crude MDI, mixtures of tolylene diisocyanates and crude MDI or mixtures of modified organic polyisocyanates containing urethane groups, having an NCO content of from 33.6 to 15% by weight, in particular those based on tolylene diisocyanates, 4,4'-diphenylmethane diisocyanate, diphenylmethane diisocyanate isomer mixtures or crude MDI, in particular crude MDI having a diphenylmethane diisocyanate isomer content of from 30 to 80% by weight, preferably from 30 to 55% by weight.

b) The relatively high-molecular-weight compounds containing at least two reactive hydrogen atoms are, in full or in part, recyclate polyols, alone or in a mixture with one another. In order to achieve the desired proportion of open cells, recyclate polyols are advantageously used in a proportion of at least 30% by weight, based on the total amount of component b). For economic reasons, the use of recyclate polyols can be significantly greater than 30% by weight or component b) can consist entirely of recyclate polyol. It is naturally also possible to use less than 30% by weight of recyclate polyols. It was surprising that a high proportion of open cells is formed and at the same time the tendency of the finished foams to shrink is low when recyclate polyols according to the invention are used in the production of rigid to semi-rigid polyurethane foams without the additional use of cell-opening reagents. The recyclate polyols are obtained by glycolysis of polyurethanes and/or polyurea-polyurethanes, in particular polyurethane and/or polyurea-polyurethane scrap, by means of short-chain hydroxyl-containing compounds, for example ethylene glycol, diethylene glycol, triethylene glycol, oligoethylene glycols, propylene glycol, dipropylene glycol, tripropylene glycol, oligopropylene glycols, butanediols, neopentyl glycol, glycerol, ethanolamine, diethanolamine and triethanolamine, if desired in the presence of catalysts, for example alkali metal salts of short-chain fatty acids, titanates, stannates and antimonates, at elevated temperature. The polyurethanes and/or polyurea-polyurethanes employed are in particular polyurethane scrap as obtained in particular, for example, in the disassembly of scrap cars (for example car seats, body parts, dashboards), it being possible for these to contain, inter alia, fillers or reinforcing materials, which do not interfere with the process. The recyclate polyols to be employed according to the invention preferably have a low amine content. They can be obtained, in particular, by carrying out the glycolysis of polyurethanes and/or polyurea-polyurethanes by metering in monofunctional and/or difunctional glycidyl ethers over the entire course of the reaction, as described in the recent German Patent Application P 42 34 335.6 of Oct. 12, 1992. The recyclate polyols can be prepared using commercially available glycidyl ethers containing one or two epoxide groups in the molecule. Particularly suitable glycidyl ethers have proven to be the monofunctional compounds of the formula (I)

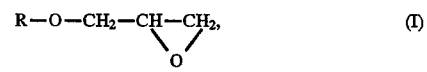
(I)

where R is phenyl, cyclohexyl, methylcyclohexyl, benzyl, i-propyl, i-butyl or methyl- and/or ethyl-branched hydrocarbon chains having 5 to 10 carbon atoms in the straight chain and/or a group of the formula

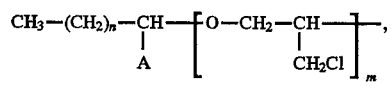

where A is alkyl having 1 to 8 carbon atoms, n is from 3 to 12 and m is from 1 to 6. Preference is given, in particular when flexible PUR foam scrap is used for the preparation of the recyclate polyols, to 2-ethylhexyl glycidyl ether or a mixture of from 50 to 85% by weight of 2-ethylhexyl glycidyl ether, from 10 to 35% by weight of one or more compounds of the structure

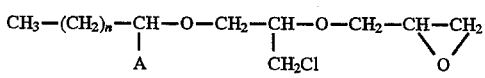

and from 5 to 20% by weight of one or more compounds of the structure

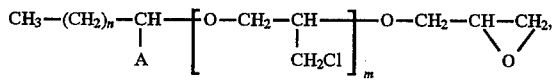

where A is alkyl having 1 to 8 carbon atoms, n is from 3 to 12 and m is from 2 to 6. This glycidyl ether mixture can be prepared in a known manner from 2-ethylhexanol and epichlorohydrin, as obtained from the synthesis of 2-ethylhexyl glycidyl ether, and employed as a technical-grade crude product, freed merely from inorganic constituents, ie. without using a distillation step. Other glycidyl ethers which have proven suitable are the difunctional compounds of the formula

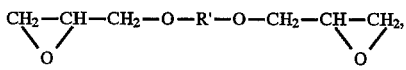

where R' is diphenylmethylene, 2,2-diphenylpropylene (bisphenol A), unbranched hydrocarbon chains having from 4 to 10 carbon atoms or methyl- and/or ethyl-branched hydrocarbon chains having 4 to 8 carbon atoms in the straight chain. The glycidyl ethers used can be monofunctional glycidyl ethers of the formula (I), alone or in a mixture with one another, difunctional glycidyl ethers of the formula (II), alone or in a mixture with one another, or mixtures of individual or a plurality of monofunctional and difunctional glycidyl ethers. The mixing ratio between the polyurethanes and/or polyurea-polyurethanes and the OH-containing compounds is highly dependent on the chemical structure of the polyurethane/polyurea-polyurethane employed and on the OH number of the OH-containing compounds employed. It is usually from 1:1 to 3:1 parts by weight, preferably 1.5 to 2.5:1 parts by weight. The reaction temperature is usually set at from 180° to 250° C., preferably at from 200° to 235° C. The reaction time is generally from 2 to 6 hours, preferably from 3 to 5 hours, depending on the crosslinking density of the polyurethanes and/or polyurea-polyurethanes employed. The glycidyl ethers are advantageously added over the entire reaction time, preferably at a uniform rate, usually in an amount of from 5 to 20% by weight, based on the entire batch, to the batch comprising polyurethane and/or polyurea-polyurethane and OH-containing compounds. In addition to the recyclate polyols, component b) can also contain organic compounds which carry in the molecule groups which are reactive toward isocyanate groups. The other relatively high-molecular-weight compounds b) containing at least two reactive hydrogen atoms are expediently those having a functionality of from 2 to 8, preferably 2 to 6, and a molecular weight of from 400 to 8000, preferably from 1200 to 6000. Success has been achieved using, for example, polyether polyamines and/or preferably polyols selected from the group consisting of the polyether-polyols, polyester-polyols, polythioether-polyols, polyester-amides, hydroxyl-containing polyacetals and hydroxyl-containing aliphatic polycarbonates, or mixtures of at least two of said polyols. Preference is given to polyester-polyols and/or polyether-polyols. The hydroxyl number of the polyhydroxyl compounds is generally from 150 to 850, preferably from 200 to 600. Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol, trimethylolpropane. Preference is given to ethanediol, diethylene glycol, 1,4-butanediol, 1,5-pentanediol, 1,6-hexanediol or mixtures of at least two of said diols, in particular mixtures of 1,4-butanediol, 1,5-pentanediol and 1,6-hexanediol. Furthermore, polyester-polyols made from lactones, eg. ε-caprolactone or hydroxycarboxylic acids, e.g. ω-hydroxycaproic acid, may also be employed. The polyester-polyols may be prepared by polycondensing the organic, eg. aromatic and preferably aliphatic polycarboxylic acids and/or derivatives thereof and polyhydric alcohols without using a catalyst or preferably in the presence of an esterification catalyst, expediently in an inert gas atmosphere, eg. nitrogen, carbon dioxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, eg. benzene, toluene, xylene or chlorobenzene, for removal of the water of condensation by azeotropic distillation. The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2. The polyester-polyols obtained preferably have a functionality of from 2 to 4, in particular from 2 to 3, and a molecular weight of from 480 to 3000, preferably from 1200 to 3000, in particular from 1800 to 2500. However, the polyols used are in particular polyether-polyols prepared by known processes, for example by anionic polymerization using alkali metal hydroxides such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably 2 to 6, reactive hydrogen atoms in bound form or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety. Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylene-diamine, phenylenediamines, 2,3-, 2,4- and 2,6-tolylenediamine and 4,4'-, 2,4'- and 2,2'-diaminodiphenylmethane. Other suitable initiator molecules are alkanolamines, eg. ethanolamine, N-methyl- and N-ethylethanolamine, dialkanolamines, eg. diethanolamine, N-methyl- and N-ethyldiethanolamine, and trialkanolamines, eg. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose. The polyether-polyols, preferably polyoxypropylene- and polyoxypropylene-polyoxyethylene-polyols, preferably have a functionality of from 2 to 6, in particular 2 to 4, and molecular weights of from 400 to 8000, preferably from 1200 to 6000, in particular from 1800 to 4000 and suitable polyoxytetramethylene glycols have a molecular weight of approximately 3500. Other suitable polyether-polyols are polymer-modified polyether-polyols, preferably graft polyether-polyols, in particular those based on styrene and/or acrylonitrile and prepared by in situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tertiary amino groups in bonded form, and/or melamine and are described, for example, in EP-B-011 752 (U.S. Pat. No. 4,304,708), U.S. Pat. No. 4,374,209 and DE-A-32 31 497. Like the polyester-polyols, the polyether-polyols can be used individually or in the form of mixtures. Furthermore, they may be mixed with the graft polyether-polyols or polyester-polyols and the hydroxyl-containing polyester-amides, polyacetals, polycarbonates and/or polyether polyamines. Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals. Suitable hydroxyl-containing polycarbonates are those of a conventional type, which can be prepared, for example, by reacting diols, such as 1,3-propanediol, 1,4-butanediol and/or 1,6-hexanediol, diethyl-ene glycol, triethylene glycol or tetraethylene glycol, with diaryl carbonates, eg. diphenyl carbonate, or phosgene. The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines. Suitable polyether-polyamines can be prepared from the abovementioned polyether-polyols by known processes. Preparation processes which may be mentioned are the cyanoalkylation of polyoxyalkylene-polyols followed by hydrogenation of the resultant nitrile (U.S. Pat. No. 3,267, 050) and the partial or full amination of polyoxyalkylene-polyols using amines or ammonia in the presence of hydrogen and catalysts (DE 12 15 373).

c) The rigid to semirigid polyurethane foams can be produced with or without the use of chain extenders and/or crosslinking agents (c). However, it may prove advantageous, in order to modify the mechanical properties, for example the rigidity, to add chain extenders, crosslinking agents or, if desired, mixtures thereof. Examples of chain extenders and/or crosslinking agents are diols and/or triols, having molecular weights of less than 400, preferably from 60 to 300. Examples are aliphatic, cycloaliphatic and/or araliphatic diols having from 2 to 14 carbon atoms, preferably from 4 to 10 carbon atoms, eg. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide, and the abovementioned diols and/or triols as initiator molecules. Any chain extenders, crosslinking agents or mixtures thereof used for the production of the rigid polyurethane foams are expediently used in an amount of from 0 to 20% by weight, preferably from 2 to 8% by weight, based on the weight of the polyol compound (b).

d) The catalysts (d) used to produce the rigid polyurethane foams are, in particular, compounds which greatly accelerate the reaction of the compounds of component (b) containing reactive hydrogen atoms, in particular hydroxyl groups and, if used, (c) with the organic, modified or unmodified polyisocyanates (a). Suitable compounds are organometallic compounds, preferably organotin compounds, such as tin(II) salts of organic carboxylic acids, eg. tin(II) diacetate, tin(II) dioctanoate, tin(II) diethylhexanoate and tin(II) dilaurate, and dialkyltin(IV) salts of organic carboxylic acids, eg. dibutyltin diacetate, dibutyltin dilaurate, dibutyltin maleate and dioctyltin diacetate. The organometallic compounds can be employed alone or preferably in combination with highly basic amines. Examples which may be mentioned are amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis (dimethylaminopropyl)urea, dimethylpiperazine, 1,2- dimethylimidazole, 1-azabicyclo[3.3.0]octane, and, preferably, 1,4-diazabicyclo[2.2.2]octane and alkanolamine compounds such as triethanolamine, triisopropanolamine, N-methyl- and N-ethyldiethanolamine and dimethylethanolamine. Other suitable catalysts are: tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having 10 to 20 carbon atoms and possibly pendant OH groups. Preference is given to 0.001 to 5% by weight, in particular from 0.05 to 2% by weight, of catalyst or catalyst combination, based on the weight of component (b).

e) The blowing agents (e) which can be employed for the production of the polyurethane foams preferably include water, which reacts with isocyanate groups to form carbon dioxide. The amounts of water expediently employed are from 0.1 to 8 parts by weight, preferably from 1.5 to 5.0 parts by weight, in particular from 2.5 to 3.5 parts by weight, based on 100 parts by weight of the polyoxyalkylene-polyols. It is also possible to employ physical blowing agents as a mixture with water. Suitable physical blowing agents are liquids which are inert toward the organic, modified or unmodified polyisocyanates (c) and which have boiling points of below 100° C., preferably below 50° C., in particular from −50° C. to 30° C., at atmospheric pressure, so that they evaporate under the conditions of the exothermic polyaddition reaction. Examples of such preferred liquids are alkanes, such as heptane, hexane, n- and isopentane, preferably technical-grade mixtures of n- and isopentanes, n- and isobutane and propane, cycloalkanes, such as cyclopentane and/or cyclohexane, ethers, such as furan, dimethyl ether and diethyl ether, ketones, such as acetone and methyl ethyl ketone, alkyl carboxylates, such as methyl formate, dimethyl oxalate and ethyl acetate, and halogenated hydrocarbons, such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. It is also possible to use mixtures of these low-boiling liquids with one another and/or with other substituted or unsubstituted hydrocarbons. Also suitable are organic carboxylic acids, for example formic acid, acetic acid, oxalic acid, ricinoleic acid and carboxyl-containing compounds. Preference is given to water, chlorodifluoromethane, chlorodifluoroethanes, dichlorofluoroethanes, pentane mixtures, cyclohexane and mixtures of at least two of these blowing agents, for example mixtures of water and cyclohexane, mixtures of chlorodifluoromethane and 1-chloro-2,2-difluoroethane and, if desired, water. The amount of physical blowing agent necessary in addition to water can easily be determined depending on the foam density desired and is from about 0 to 25 parts by weight, preferably 0 to 15 parts by weight, per 100 parts by weight of the polyoxyalkylene-polyols. It may be expedient to mix the modified or unmodified polyisocyanates (c) with the inert physical blowing agent and thus to reduce the viscosity.

f) The reaction mixture for the production of the rigid to semirigid polyurethane foams may also be admixed with auxiliaries and/or additives (f) conventional in polyurethane chemistry. Additives and auxiliaries which may be mentioned are foam stabilizers, fillers, dyes, pigments, flameproofing agents, hydrolysis-protection agents, and fungistatic and bacteriostatic substances. For the purposes of the present invention, fillers, in particular reinforcing fillers, are conventional organic and inorganic fillers, reinforcing agents, weighting agents, agents for improving the abrasion behavior of paints, coating compositions etc known per se. Specific examples are inorganic fillers, such as silicate minerals, for example phyllosilicates, such as antigorite, serpentine, hornblends, amphiboles, chrysotile, talc; metal oxides, such as kaolin, aluminum oxides, titanium oxides and iron oxides, metal salts, such as chalk, barytes and inorganic pigments, such as cadmium sulfide, zinc sulfide and glass, inter alia. Preference is given to kaolin (china clay), aluminum silicate and coprecipitates of barium sulfate and aluminum silicate, and natural and synthetic fibrous minerals, such as wollastonite, metal fibers and in particular glass fibers of various lengths, if desired sized. Examples of suitable organic fillers are: carbon, melamine, collophony, cyclopentadienyl resins and graft polymers, and also cellulose fibers, polyamide, polyacrylonitrile, polyurethane and polyester fibers based on aromatic and/or aliphatic dicarboxylic esters and in particular carbon fibers. The inorganic and organic fillers may be used individually or as mixtures and are advantageously introduced into the reaction mixture in amounts of from 0.5 to 50% by weight, preferably from 1 to 40% by weight, based on the weight of components (a) to (c), but the content of mats and nonwoven and woven fabrics made from natural or synthetic fibers can achieve values of up to 80. Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethylmethane phosphonate, diethyl diethanolaminomethyl phosphonate, and commercially available halogen-containing polyols having flameproofing properties. In addition to the abovementioned halogen-substituted phosphates, it is also possible to use inorganic or organic flameproofing agents, such as red phosphorus, aluminum oxide hydrate, antimony trioxide, arsenic oxide, ammonium polyphosphate and calcium sulfate, expandable graphite or cyanuric acid derivatives, eg. melamine, or mixtures of two or more flameproofing agents, eg. ammonium polyphosphates and melamine, and also, if desired, cornstarch or ammonium polyphosphate, melamine and expandable graphite and/or, if desired, aromatic polyesters, in order to flameproof the polyisocyanate polyaddition products. In general, it has proven expedient to use from 5 to 50 parts by weight, preferably from 5 to 25 parts by weight, of said flameproofing agents per 100 parts by weight of component (b). The rigid to semirigid polyurethane foams according to the invention can advantageously be produced without addition of special cell openers although the use of cell-regulating substances is naturally also possible. The proportion of open cells can be influenced by the amount of recyclate polyols depending on the type of any further relatively high-molecular-weight compounds containing at least two reactive hydrogen atoms b). In order to achieve the large proportion of open cells which is desired, depending on the area of application, the recyclate polyols according to the invention are advantageously employed in an amount of at least 30% by weight, based on the total amount of component b). Further details on the other conventional auxiliaries and additives mentioned above can be obtained from the specialist literature, for example from the monograph by J. H. Saunders and K. C. Frisch in High Polymers, Volume XVI, Polyurethanes, Parts 1 and 2, Interscience Publishers 1962 and 1964 respectively, or Kunststoff-Handbuch, Polyurethane, Volume VII, Hanser-Verlag, Munich, Vienna, 1st and 2nd Editions, 1966 and 1983.

In order to produce the rigid to semirigid polyurethane foams, the organic polyisocyanates (a), the relatively high-molecular-weight compounds containing at least two reactive hydrogen atoms (b) and, if used, chain extenders and/or crosslinking agents (c) are reacted in such amounts that the ratio between the number of equivalents of NCO groups in the polyisocyanates (a) and the total number of reactive hydrogen atoms in components (b) and, if used, (c) is from 0.7 to 1.5:1. If the rigid polyurethane foams contain at least some bonded isocyanurate groups, the ratio between the NCO groups in the polyisocyanates (a) and the total number of reactive hydrogen atoms in component (b) and, if used, (c) is usually from 1.5 to 60:1, preferably from 1.5 to 8:1.

The rigid to semirigid polyurethane foams are advantageously produced by the one-shot process or the prepolymer process with the aid of the high-pressure or low-pressure method in open or closed molds, for example metallic molds, or are freely foamed (in-situ foam). It has proven particularly advantageous to use the two-component process and to combine formative components (b), (d) and, if used, (c), (e) and (f) in component (A) and to use the organic and/or modified organic polyisocyanates (a) or mixtures of said polyisocyanates and, if desired, blowing agents (d) as component (B).

The formative components are mixed at from 15° to 90° C., preferably at from 20° to 60° C., in particular at from 20° to 35° C., and, in the case of the production of molded foams, are introduced into the open or closed mold. The mold temperature is expediently from 20° to 110° C., preferably from 30° to 60° C., in particular from 45° to 50° C.

In the case of free foaming, slabs are produced for subsequent mechanical treatment, for example by sawing, for example to give boards. It is likewise possible to adjust the reactivity of novel polyurethane systems in such a way that they can be processed by the known processes of the foam spraying (spray-foe process), it being possible to coat vertical, horizontal and suspended (overhead) surfaces.

The rigid to semirigid polyurethane foams produced by the novel process have a density of from 0.02 to 0.75 g/cm$^3$, preferably from 0.025 to 0.24 g/cm$^3$, in particular from 0.03 to 0.1 g/cm$^3$. They have a uniformly fine-celled foam structure. The proportion of open cells is >20%, measured by the air permeability method, and the finished foam moldings have minimal shrinkage.

The rigid to semirigid polyurethane foams produced by the novel process are suitable for all conventional applications of rigid to semirigid polyurethane foams in which an increased proportion of open cells is important.

The invention is described by means of the examples below:

EXAMPLE 1

77.4% by weight of recyclate polyol prepared from flexible polyurethane foam scrap (car seats), (OH number 318 mg of KOH/g) were mixed with 10.0% by weight of a sucrose/glycerol-initiated polyether alcohol having a functionality of 8 (OH number 440 mg of KOH/g), 3.0% by weight of glycerol, 0.6% by weight of dimethylcyclohexylamine, 3.0% by weight of silicone stabilizer and 6.0% by weight of water. The component A prepared in this way was reacted with polymeric diphenylmethane diisocyanate (crude MDI) in a mixing ratio of 100:190.

This gave a fine-celled rigid foam having a density of 34 kg/m$^3$, a proportion of open cells of 39% and minimal shrinkage. The dimensional stability measured at −30° C. and +80° C. was less than 1%.

EXAMPLE 2

59.5% by weight of recyclate polyol prepared from flexible polyurethane foam scrap (car seats), (OH number 324 mg of KOH/g) were mixed with 30.0% by weight of a sucrose/glycerol-initiated polyether alcohol having a functionality of 8 (OH number 440 mg of KOH/g), 3.0% by weight of glycerol, 0.5% by weight of tetramethylhexamethylenediamine, 3.0% by weight of silicone stabilizer and 4.0% by weight of water. The component A prepared in this way was reacted with polymeric diphenylmethane diisocyanate (crude MDI).

This gave a fine-celled rigid foam having a density of 37 kg/m$^3$, a proportion of open cells of 44% and minimal shrinkage. The dimensional stability measured at −30° C. and +80° C. was less than 1%.

EXAMPLE 3

31.0% by weight of recyclate polyol prepared from flexible polyurethane foam scrap (car seats), (OH number 324 mg of KOH/g) were mixed with 30.0% by weight of a polyether alcohol based on glycerol, propylene oxide and ethylene oxide (OH number 56 mg of KOH/g), 10.0% by weight of a sucrose/glycerol-initiated polyether alcohol having a functionality of 8 (OH number 440 mg of KOH/g), 2.5% by weight of methyldicyclohexylamine, 1.5% by weight of silicone stabilizer and 25.0% by weight of water. The component A prepared in this way was reacted with polymeric diphenylmethane diisocyanate (crude MDI) in a mixing ratio of 100:120.

This gave a fine-celled rigid foam having a density of 20 kg/m$^3$, a proportion of open cells of 87% and minimal shrinkage.

EXAMPLE 4

38.0% by weight of recyclate polyol prepared from flexible polyurethane foam scrap (car seats), (OH number 324 mg of KOH/g) were mixed with 32.5% by weight of a polyether alcohol based on glycerol, propylene oxide and ethylene oxide (OH number 56 mg of KOH/g), 3.0% by weight of methyldicyclohexylamine, 1.5% by weight of silicone stabilizer and 25.0% by weight of water. The component A prepared in this way was reacted with polymeric diphenylmethane diisocyanate (crude MDI) in a mixing ratio of 100:130.

This gave a foam having a density of 19 kg/m$^3$, a proportion of open cells of 92% and minimal shrinkage.

EXAMPLE 5

Comparative Example 87.0% by weight of a sucrose/glycerol-initiated polyether alcohol having a functionality of 8 (OH number 440 mg of KOH/g) were mixed with 3.0% by weight of glycerol, 1.0% by weight of dimethylcyclohexylamine, 3.0% by weight of silicone stabilizer and 6.0% by weight of water. The component A prepared in this way was reacted with polymeric diphenylmethane diisocyanate (crude MDI) in a mixing ratio of 100:215 to give a rigid foam having a density of 34 kg/m$^3$. This foam contained 8% of open cells and shrank greatly.

EXAMPLE 6

Comparative Example 88.5% by weight of a sucrose/glycerol-initiated polyether alcohol having a functionality of 8 (OH number 440 mg of KOH/g) were mixed with 3.0% by weight of glycerol, 1.0% by weight of dimethylcyclohexylamine, 3.0% by weight of silicone stabilizer and 4.5% by weight of water. The component A prepared in this way was reacted with polymeric diphenylmethane diisocyanate (crude MDI) in a mixing ratio of 100:190 to give a fine-celled rigid foam having a density of 40 kg/m$^3$. This foam contained 5% of open cells and shrank greatly.

We claim:

1. A process for the production of rigid or semirigid polyurethane foams having an increased content of open cells and reduced shrinkage, said process comprising reacting
   a) organic and/or modified organic polyisocyanates with
   b) at least one compound containing at least two reactive hydrogen atoms, and, optionally,
   c) chain extenders and/or crosslinking agents, in the presence of
   d) catalysts,
   e) optionally, desired, blowing agents and
   f) optionally, auxiliaries and/or additives,
wherein component b) comprises a recyclate polyol obtained by glycolysis of polyurethanes and/or polyurea-polyurethanes using glycidyl ethers, without the use of cell openers.

2. A process as defined in claim 1, wherein the recyclate polyol is used in an amount of at least 30% by weight, based on the total amount of component b).

3. A process as defined in claim 1, wherein the recyclate polyol is prepared by glycolysis of flexible polyurethane foams.

4. A process as defined in claim 1, wherein monofunctional and/or difunctional glycidyl ethers are used in the preparation of the recyclate polyols.

5. A process as defined in claim 1, wherein the recyclate polyol employed has a low amine content.

6. A rigid or semirigid polyurethane foam having an increased content of open cells and reduced shrinkage, said foam comprising the reaction product of
   a) organic and/or modified organic polyisocyanates with
   b) at least one compound containing at least two reactive hydrogen atoms, and, optionally,
   c) chain extenders and/or crosslinking agents, in the presence of
   d) catalysts,
   e) optionally, blowing agents and
   f) optionally, auxiliaries and/or additives,
wherein component b) comprises a one recyclate polyol obtained by glycolysis of polyurethanes and/or polyurea-polyurethanes using glycidyl ethers, without the use of cell openers..

7. A rigid or semirigid polyurethane foam as defined in claim 6, wherein the recyclate polyol is used in an amount of at least 30% by weight, based on the total amount of component b).

8. A rigid or semirigid polyurethane foam as defined in claim 6 having a proportion of open cells of at least 20%.

9. A process as defined in claim 2, wherein the recyclate polyol is prepared by glycolysis of flexible polyurethane foams.

10. A process as defined in claim 9, wherein monofunctional and/or difunctional glycidyl ethers are used in the preparation of the recyclate polyol.

11. A process as defined in claim 10, wherein the recyclate polyol employed has a low amine content.

12. A process as defined in claim 2, wherein monofunctional and/or difunctional glycidyl ethers are used in the preparation of the recyclate polyol.

13. A process as defined in claim 12, wherein the recyclate polyol employed has a low amine content.

14. A process as defined in claim 3, wherein monofunctional and/or difunctional glycidyl ethers are used in the preparation of the recyclate polyol.

15. A process as defined in claim 14, wherein the recyclate polyol employed has a low amine content.

16. A rigid or semirigid foam as defined in claim 7, having a proportion of open cells of at least 20 percent.

* * * * *